(12) United States Patent
Gaeta et al.

(10) Patent No.: US 11,176,365 B1
(45) Date of Patent: *Nov. 16, 2021

(54) DOCUMENT DATA CAPTURE

(71) Applicant: United Services Automobile Association (USAA), San Antonio, TX (US)

(72) Inventors: Michael Joseph Gaeta, San Antonio, TX (US); Salvador Rodriguez, Boerne, TX (US); Bharat Prasad, San Antonio, TX (US); Jason Algernon Webster, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/593,563

(22) Filed: Oct. 4, 2019

Related U.S. Application Data

(63) Continuation of application No. 15/692,443, filed on Aug. 31, 2017, now Pat. No. 10,445,571.

(60) Provisional application No. 62/382,519, filed on Sep. 1, 2016.

(51) Int. Cl.
| | |
|---|---|
| *G06F 16/93* | (2019.01) |
| *G06K 9/00* | (2006.01) |
| *G06K 9/20* | (2006.01) |
| *G06N 5/04* | (2006.01) |
| *G06N 20/00* | (2019.01) |
| *G06F 3/0486* | (2013.01) |
| *G06F 40/169* | (2020.01) |

(52) U.S. Cl.
CPC ....... *G06K 9/00469* (2013.01); *G06F 3/0486* (2013.01); *G06F 16/93* (2019.01); *G06F 40/169* (2020.01); *G06K 9/2081* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,070,150 A * | 5/2000 | Remington | G06Q 20/04 705/34 |
| 7,873,576 B2 | 1/2011 | Jones et al. | |

(Continued)

*Primary Examiner* — Maikhanh Nguyen
(74) *Attorney, Agent, or Firm* — Fletcher Yoder, P.C.

(57) ABSTRACT

Techniques are described for capturing data from a digital document through the use of targeted user feedback regarding the position(s) of particular data field(s) in the document. Implementations enhance the speed and accuracy of data capture from documents and/or images of documents by providing a helpful and intuitive set of controls to enable the end user to indicate the position(s) of field(s) on a document. Through specification of the position of the field in the document, implementations may isolate the portion of the document where data extraction is to be performed to determine the associated value of the field. Any suitable number of field values may be extracted from the document in this manner, based on positions indicated by the user using the provided control(s). In some implementations, one or more actions may be automatically performed based on the extracted data, such as automated bill payment actions.

17 Claims, 6 Drawing Sheets

(56) References Cited

U.S. PATENT DOCUMENTS

| | | | | |
|---|---|---|---|---|
| 7,945,240 B1* | 5/2011 | Klock | ............... | G06Q 30/04 |
| | | | | 455/406 |
| 8,290,237 B1* | 10/2012 | Burks | ............... | G06Q 20/042 |
| | | | | 382/137 |
| 8,379,914 B2 | 2/2013 | Nepomniachtchi et al. | | |
| 8,688,576 B2* | 4/2014 | Hanson | ............... | G06Q 20/40 |
| | | | | 705/40 |
| 9,639,830 B2* | 5/2017 | Rodriguez | ............... | G06Q 20/102 |
| 10,062,072 B2* | 8/2018 | Davis | ............... | G06Q 20/325 |
| 2002/0128967 A1 | 9/2002 | Meyer et al. | | |
| 2003/0177090 A1 | 9/2003 | Eden | | |
| 2004/0153408 A1 | 8/2004 | Jones et al. | | |
| 2007/0100749 A1* | 5/2007 | Bachu | ............... | G06Q 20/108 |
| | | | | 705/42 |
| 2008/0015982 A1* | 1/2008 | Sokolic | ............... | G06Q 40/02 |
| | | | | 705/39 |
| 2009/0108080 A1* | 4/2009 | Meyer | ............... | G06Q 20/102 |
| | | | | 235/494 |
| 2012/0011057 A1* | 1/2012 | Raman | ............... | G06Q 40/02 |
| | | | | 705/38 |
| 2012/0078764 A1* | 3/2012 | Ross | ............... | G06Q 20/14 |
| | | | | 705/35 |
| 2012/0078781 A1* | 3/2012 | Ross | ............... | G06Q 40/02 |
| | | | | 705/40 |
| 2014/0012744 A1* | 1/2014 | Hanson | ............... | G06Q 20/102 |
| | | | | 705/40 |
| 2015/0248405 A1 | 9/2015 | Rudich et al. | | |
| 2015/0254617 A1* | 9/2015 | Rodriguez | ............... | G06Q 20/102 |
| | | | | 705/7.26 |
| 2016/0180325 A1* | 6/2016 | Davis | ............... | G06Q 20/325 |
| | | | | 705/44 |

* cited by examiner

DOCUMENT DATA CAPTURE

CROSS-REFERENCE TO RELATED APPLICATIONS

The present disclosure is a continuation of and claims priority to U.S. patent application Ser. No. 15/692,443, filed Aug. 31, 2017, titled "Document Data Capture, which issued as U.S. Pat. No. 10,445,571 on Oct. 15, 2019, and which claims priority to U.S. Provisional Patent Application No. 62/382,519, filed Sep. 1, 2016, titled "Document Data Capture," the entireties of which are incorporated by reference into the present disclosure.

BACKGROUND

In a variety of environments, digital documents have replaced printed paper documents as a mechanism for delivering information to individuals. Although providing information digitally is a convenience for many individuals and a cost-saving mechanism for many organizations, the large and increasing amount of digitally available information creates scaling problems for traditional data extraction and processing methods. Techniques such as optical character recognition (OCR) and intelligent character recognition (ICR) have been developed to convert image data to text data by analyzing an image of a document. However, OCR and ICR currently do not adequately provide semantic information regarding the extracted text. For example, OCR or ICR may determine that a particular word is present in a document, but traditional OCR and ICR may be unable to determine the meaning, context, and/or significance of the particular word within the document.

SUMMARY

Implementations of the present disclosure are generally directed to extracting information from document(s). More specifically, implementations are directed to determining the value of one or more fields present in a document based on user-indicated position information indicating a location of the one or more fields in the document.

In general, innovative aspects of the subject matter described in this specification can be embodied in methods that include operations of: analyzing a document using a position engine that is trained through machine learning to predict, for each of one or more fields to be evaluated in the document, a portion of the document that includes the respective field; presenting the document in a user interface (UI) that includes at least one control to indicate at least one position in the document, wherein each control is presented in the UI at a respective initial position in the portion of the document that is predicted to include the respective field; receiving position information indicating a respective position of each of one or more fields in the document, the respective position indicated, through the UI, using a respective control; determining a value for each of the one or more fields based at least partly on an analysis of the document in proximity to the respective position of each of the one or more fields; and performing one or more actions based on the value for each of the one or more fields.

Implementations can optionally include one or more of the following features: the operations further include incorporating metadata into the document, the metadata describing the value for each of the one or more fields; the metadata is incorporated into the document as a barcode of one or more dimensions; the metadata further describes the respective position of each of the one or more fields in the document; the position engine is trained using training data that includes previously determined position information for one or more documents; each of the one or more controls is associated with a respective field of the one or more fields; the respective field associated with a control is indicated by a label that is presented with the control; at least one control is initially unassociated with a field of the one or more fields; the UI enables the at least one control to be labeled with an associated field by the user; the one or more actions include initiating a funds transfer in an amount according to the value of at least one of the fields.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. Traditional systems that extract data from documents, such as traditional OCR, ICR, and so forth, may examine a document to look for image patterns, employ pixel matching, word searching, or other techniques. In traditional systems, document image quality has a large effect on the accuracy of the extracted data and/or whether automated data extraction can be performed at all. Implementations provide for fast and/or accurate data extraction from a document even in instances where the document image quality is poor, corrupted, and/or somehow incomplete, by using the user-positioned control(s) as hints or guides to where the relevant field values may be found on the document. Use of the user-provided position information may also help an automated process to more quickly identify the relevant data in situations where a document may include a large amount of information but only a few relevant fields. For example, a utility bill may include a large amount of text for advertisements, standard legal disclaimers, terms of service, or other text (e.g., noise) that may not be relevant to the particular action to be performed (e.g., paying the bill). By employing the user-specified position information, implementations may more rapidly identify and focus on the few relevant pieces of information, such as the amount due, account number, due date, and so forth. In this way, implementations may readily extract the relevant information from a document and use that information to perform an action (e.g., pay a bill), and such extraction and/or action(s) may be performed more quickly and more accurately compared to traditional document analysis techniques. By provide for more accurate and faster data extraction from document(s), implementations consume less processing power and less runtime memory than traditional data extraction systems that are slower and more error prone. Moreover, faster and more accurate information extraction may allow implementations to avoid the initiation of erroneous transactions that may otherwise be caused by inaccurate data extraction, and may allow implementations to avoid the expenditure of processing resources, network capacity, memory, storage space, and/or other computing resources that traditional document analysis systems may expend to correct erroneous data extraction, undo incorrectly initiated transactions, or fix other problems.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
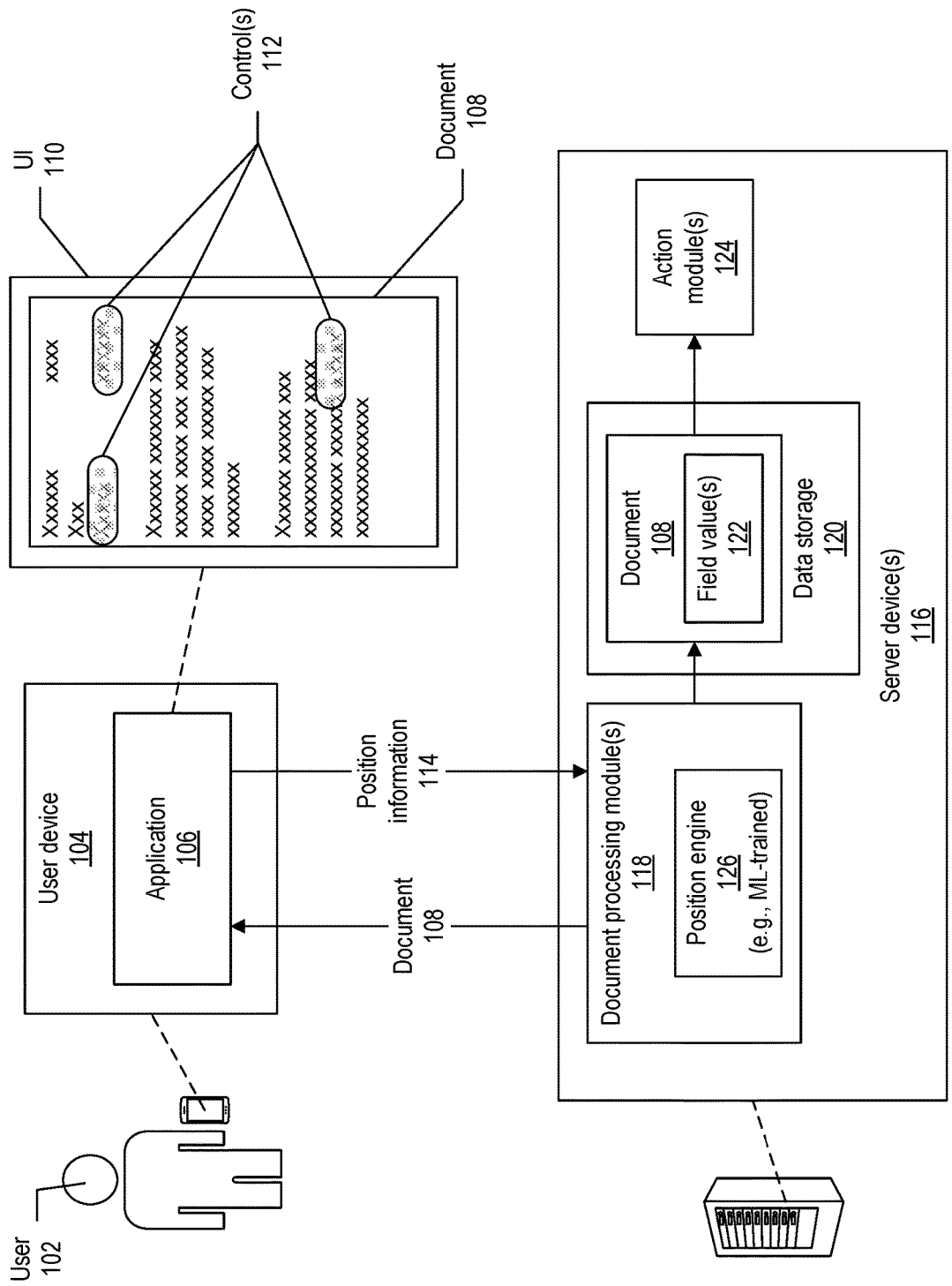
FIG. 1 depicts an example system for extracting data from a document, according to implementations of the present disclosure.

Implementations of the present disclosure are directed to systems, devices, methods, and computer-readable media for capturing data from a digital document through the use of targeted user feedback regarding the position(s) of particular data field(s) in the document. Implementations enhance the speed and accuracy of data capture from documents and/or images of documents by providing a helpful and intuitive set of controls to enable the end user to indicate the position(s) of field(s) on a document. For example, a user interface (UI) may present a document or an image of a document, such as a bill to be paid. The user may manipulate a set of controls provided by the UI to indicate the position(s) of various field(s) in the bill, such as the minimum amount due, due date, account number, account balance, and so forth. In some implementations, the UI includes a set of controls that are floater controls. Each floater control may display a keyword or tag that indicates a corresponding field for the floater control, such as "amount due," "due date," and so forth. The user may drag the floater control to a position of the corresponding field in the bill, to indicate the position of the field in the document. Through such specification of the position of the field in the document, implementations may isolate the portion of the document where data extraction is to be performed to determine the associated value of the field. For example, a user may drag the "Minimum Payment" floater control to the region of the document where the minimum payment value is specified, and implementations may then extract the minimum payment value from the document using OCR, ICR, and/or any other suitable text recognition technique. Any suitable number of field values may be extracted from the document in this manner, based on positions indicated by the user using the control(s) of the UI.

In some implementations, one or more actions may be automatically performed based on the extracted data. For example, an automated bill payment action may be performed based on the extracted field values for account number, minimum payment due, due date, bill payee, and so forth. Such an action may include initiating a transfer of funds in the amount of the minimum payment due, to the payee, on or before the due date, referencing the extracted account number of the user.

The number and/or keywords for the controls may be specific to the type of document being viewed and/or the application that is being employed to present the document. For example, if the user is viewing a mortgage application document in a financial services application, the control(s) may include control(s) to extract field value(s) that are relevant to a mortgage application and/or home finance in general. In some implementations, the application flow can have context regarding the particular document, or type of document, that is being presented in the UI of the application. The UI may present controls for determining the field values that may be relevant to the subsequent actions to be performed, based on the document type. For example, if the document is a bill, the control(s) may include floater control(s) for identifying bill due date, amount due, account number, and/or other field value(s) that are needed to pay the bill.

In some implementations, the UI may present control(s) (e.g., floater control(s)) that are not initially associated with a particular field in the document. The user may move an initially unassociated floater control to a particular position on the document, and the user may add a keyword or tag to the control to indicate the associated field. In this way, implementations enable the creation of a custom floater control that may be associated with one field of a plurality of possible fields in a document. In some implementations, the number of control(s) may be constrained to be fewer than a maximum number of control(s) (e.g., five or fewer), to provide for a more useable and not overly complicated user experience.

In some implementations, metadata may be generated for the document based on the determined positions of the fields, as indicated by the placement of the control(s) in the UI. The metadata may include coordinate information indicating the position(s) of the various control(s), thus indicating the portion(s) of the document to be analyzed to extract the field values. In some implementations, the metadata may also include the field values themselves as a set of one or more key-value pairs. For example, if the analysis of the control position(s) is performed on the user device, the extraction of the field values may also be performed on the user device. In such instances, the field values may be incorporated into the metadata instead of, or in addition to, the field position information. The metadata may be added to the document as an artifact, such as an Extensible Markup Language (XML) artifact. In some implementations, the metadata may be converted to a barcode which is imprinted on the document or otherwise included with the document. The barcode may be a one-dimensional barcode, such as a barcode formatted according to a version of the Universal Product Code (UPC) standard. In some instances, the barcode may be multi-dimensional, such as a barcode formatted according to a version of Quick Response (QR) Code™.

The metadata, formatted as a barcode or otherwise, may accompany the document when the document is sent to server device(s) for analysis. The metadata may be used for further analysis of the document. For example, the metadata may be employed to index the document into the appropriate repository folder, to launch various action(s) based on the extracted metadata, and/or for other purposes. In instances where the metadata includes field position information but not field value(s), the metadata may indicate the coordinates of the position(s) of the various field(s). The portion(s) of the document in proximity to the position(s) may be analyzed to extract the field values from the document. Such analysis may include performing OCR and/or ICR on the portion of the document that is proximity to the position indicated for a particular field. Use of user-indicated position information to facilitate targeted data extraction from a document reduces the amount of processing that is needed for high level document semantic analysis to extract relevant field values.

FIG. 1 depicts an example system for extracting data from a document, according to implementations of the present disclosure. As shown in the example of FIG. 1, a user device 104 may execute an application 106. The user device 104 may be owned by, operated by, or otherwise associated with a user 102. The user device 104 may be any suitable type of computing device, including a portable device (e.g., smartphone, tablet computer, wearable computer, etc.) or a less portable type of computing device (e.g., desktop computer, laptop computer, etc.). The system may also include one or more server devices 116 that communicate with the user device 104 over one or more networks. The server device(s) 116 may include any suitable number and type of computing device. In some instances, the server device(s) 116 may be distributed computing device(s) (e.g., cloud computing server(s)).

The application 106 may receive a document 108 from the server device(s) 116 or elsewhere. In some instances, the document 108 may be stored locally on the user device 104, or elsewhere, and the document 108 may be retrieved from storage by the application 106. The document 108 may be a digital document that is in any suitable format, such as a version of the Portable Document Format (PDF) developed by Adobe Systems™. In some instances, the document 108 may be an image of a (e.g., physical, paper) document. The document may also be a (e.g., web) page described using a version of Hypertext Markup Language (HTML), Extensible Markup Language (XML), and so forth. The image may be in any suitable image format, such as a version of the Joint Photographic Experts Group (JPEG) format, a version of the Graphics Interchange Format (GIF), a version of a bitmap image file format (BMP), and so forth. The document 108 may be of any appropriate size, and/or may include any appropriate number of pages, sections, words, paragraphs, characters, and so forth.

Implementations provide for the processing of documents 108 that include any type of information. In some instances, a document 108 may be a bill, such as a utility bill (e.g., for power, water, sewage, gas, television, network data, etc.), a credit card or loan statement, a medical bill, an insurance bill, or a bill requesting payment for other types of goods or services. The document 108 may also include other types of information, such as a contract or agreement, ownership documents (e.g., titles, bills of sale, etc.), other types of legal documents, commercial data such as sales, inventory, and/or shipment information, and, so forth.

The application 106 may present the document 108 in a UI 110. The UI 110 may be rendered within a display component (e.g., screen) of the user device 104, on in a display that is external to and in communication with the user device 104. In some implementations, the UI 110 may also present one or more controls 112, such as floater control(s). The user 102 may slide, drag and drop, click, or otherwise gesture to position each control 112 at or near a field to be extracted from the document 108. For example, the UI 110 may present a document 108 that is a utility bill and the user 102 may manipulate and position the control(s) 112 at or near fields for the due date, minimum amount due, account balance, past due amount, account number, accountholder's name, the name of the utility to be paid, and/or other information in the bill.

In some implementations, the application 106 may determine position information 114 that describes the position(s) where the user 102 has placed one or more of the control(s) 112 on the document 108. The position information 114 may indicate position(s) as X and Y coordinates, pixel row and column indications, and/or using other techniques to indicate location(s) on the document 108. The position information 114 may be communicated to the server device(s) 116 over one or more networks. The position information 114 may be received by one or more document processing modules 118 executing on the server device(s) 116. The document processing module(s) 118 may analyze the portion(s) of the document 108 that are at or in proximity to the position(s) of the control(s) 112 indicated by the position information 114. Based on this analysis, the document processing module(s) 118 may extract or otherwise determine a value for each of the fields indicated by the control(s) 112. Such extraction may include applying OCR and/or ICR to a portion of the document 108 in proximity to a position, to determine text data that is present in that portion of the document 108.

The determined field value(s) 122 may be stored in metadata that is associated with the document 108. For example, the field value(s) 122 may be stored as metadata including one or more key-value pairs, where the key is a field name or identifier (e.g., "bill due date") and the value is the value of the field that is present in the document 108 (e.g., "Mar. 15, 2016"). In some implementations, the metadata may be incorporated into the document 108. Alternatively, the metadata may be stored separately from the document 108, but associated with a document ID that uniquely identifies the document 108. In some implementations, the metadata including the field value(s) 122 may be incorporated into the document as a barcode of one or more dimensions as described above. In some implementations, the document 108 and/or the field value(s) 122 (e.g., metadata) may be stored in data storage 120. The data storage 120 may be local to the server device(s) 116 or may be separate from the server device(s) 116 and accessible over one or more networks.

In some implementations, the server device(s) 116 (or other computing device(s)) may execute one or more action modules 124 that automatically perform one or more actions based on the field value(s) 122 and/or other metadata of a document 108. For example, the action module(s) 124 may access a document 108 that is a bill and, based on the field value(s) 122, perform operations to automatically pay the bill. Such action(s) may include initiating a funds transfer (e.g., over Automated Clearing House (ACH) or some other payment channel) to transfer funds from an account of the user 102 to an account of the biller/payee.

Other operations may also be performed based on the field value(s) 122 extracted from the document 108. In some implementations, such operations may include data masking, encryption, and/or decryption. For example, a sender of the document could use the UI tool to indicate areas and/or fields of the document that are to be masked and/or encrypted before the document is transmitted to the receiver. The receiver can point the UI tool to the encrypted and/or masked fields to decrypt and/or unmask them. The UI tool pointer may also have other capabilities, such as certificate-based encryption and/or decryption capabilities.

In some implementations, user driven automation may be performed based on the extracted field values. Based on the data extracted by the system from areas of the document indicated by the user, backend automation can execute a process that will employ the extracted data for perform one or more actions. For example, a vehicle insurance claims process can be initiated based on a vehicle identification number (VIN) and a damage estimate, where such values are included in a document issued by a body shop or other vendor. As another example, a document may describe an existing insurance policy, and the document may include the field values that are needed for a new insurer to provide a new quote to the user and enable switching the user to the new policy. As another example, document(s) may be (e.g., verbose) legal document(s), and a mortgage application process can be expedited by collecting key data fields indicated by the user in the legal documents.

In some implementations, at least a portion of the analysis performed by the document processing module(s) 118 may be performed on the client-side, e.g., on the user device 104. For example, the application 106 or some other component may analyze the portion(s) of the document 108 indicated by the position(s) of the control(s) 112, and extract the field value(s) 122 from the document 108 on the user device 104. The field value(s) 122 may be communicated to the server device(s) 116 for use by the action module(s) 124. In some implementations, the action module(s) 124 may also execute on the user device 104 to perform action(s) based on the extracted field value(s) 122. In some implementations, the document 108 may be communicated from the user device 104 to the server device(s) 116 with metadata that includes the field value(s) 122 that are extracted from the document 108 on the user device 104. As described above, in some instances the metadata may be embedded in the document 108 as a barcode of one or more dimensions. Accordingly, the processing described herein may be performed on the user device 104, on the server device(s) 116, or may be distributed to be performed partly on the user device 104 and partly on the server device(s) 116.

In some implementations, the document processing module(s) 118 executing on the server device(s) 116, the user device 104, or elsewhere may include a position engine 126. The position engine 126 may be trained to predict or otherwise determine the position(s) of field(s) in the document 108, and the control(s) 112 may be initiated located at the estimated position(s) prior to being adjusted by the user 102. Accordingly, implementations may provide an initial guess at the position(s) of field(s) in a document 108, and the user 102 may correct and/or adjust the position(s) as needed to provide for more accurate field value extraction. In some implementations, the initial position(s) of the control(s) 112 may be along one side of the UI 110 or in other location(s) that are not based on an estimate of field location(s) in the document 108. In some implementations, the position engine 126 may be trained, refined, or otherwise developed using one or more machine learning (ML) techniques, which may include supervised and/or unsupervised ML techniques.

Traditional systems that extract data from documents, such as traditional OCR, ICR, and so forth, may examine a document to look for image patterns, employ pixel matching, word searching, or other techniques. In traditional systems, document image quality has a large effect on the accuracy of the extracted data and/or whether automated data extraction can be performed at all. Implementations provide for fast and/or accurate data extraction from a document even in instances where the document image quality is poor, corrupted, and/or somehow incomplete, by using the user-positioned control(s) as hints or guides to where the relevant field values may be found on the document. Use of the user-provided position information may also help an automated process to more quickly identify the relevant data in situations where a document may include a large amount of information but only a few relevant fields. For example, a utility bill may include a large amount of text for advertisements, standard legal disclaimers, terms of service, or other text (e.g., noise) that may not be relevant to the particular action to be performed (e.g., paying the bill). By employing the user-specified position information, implementations may more rapidly identify and focus on the few relevant pieces of information, such as the amount due, account number, due date, and so forth. In this way, implementations may readily extract the relevant information from a document and use that information to perform an action (e.g., pay a bill), and such extraction and/or action(s) may be performed more quickly and more accurately compared to traditional document analysis techniques. Faster and more accurate information extraction may allow implementations to avoid the initiation of erroneous transactions that may otherwise be caused by inaccurate data extraction, and may allow implementations to avoid the expenditure of processing resources and/or other computing resources that traditional document analysis systems may expend to correct erroneous data extraction, undo incorrectly initiated transactions, or fix other problems.

In some implementations, the control(s) 112 (e.g., floater control(s)) may include contextual control(s). Such contextual control(s) 112 may each be associated with a particular field of the document 108. For example, a particular control 112 may be associated with the "due date" field, and the control 112 may be presented in the UI 110 with a tag, label, or ID indicating that it is the "due date" control. The user 102 may then be prompted to move the "due date" control to be at, over, near, or otherwise proximal to the due date field in the document 108. Implementations also support the use of free-form control(s) 112 that are initially unassociated with particular field(s). For example, the UI 110 may present an unlabeled, free-form control 112 and the user 112 may move the control 112 to a particular field on the document 108 (e.g., the minimum payment field). The UI 110 may enable the user 102 to add a tag, label, or ID to the control 112 to indicate the particular field where it has been placed. In some instances, the UI 110 may present a drop-down list or other UI element that lists the possible labels to choose from, and the user 102 may select from the list to apply a label to the previously unlabeled control 112.

In some implementations, the control(s) 112 that are available for use in identifying fields in a document 108 may be based on the particular type of document 108 that is being presented in the UI 110. For example, if the presented document 108 is a utility bill, the UI 110 may present controls 112 labeled as "due date," "account balance," "account number," "minimum payment due," and so forth, e.g., fields that may be found in a utility bill. If the presented document 108 is an insurance claim form, the UI 110 may present controls 112 labeled as "bodily injury type," "monetary damage," "medical expenses," "claim number," "insurance policy number," and so forth, e.g., fields that may be found in insurance claim forms. In implementations where the control(s) 112 are free-form, e.g., initially unlabeled and/or unassociated with particular field(s), the dropdown list or other UI element for labeling control(s) may be populated with available labels that are relevant to the type of document 108 being presented.

In some implementations, the number of controls 112 presented may be limited to a maximum number of controls 112 for a particular type of document 108. For example, the UI 110 may present no more than five or six control(s) in a particular instance. More control(s) may lead to confusion and/or frustration experienced by the user 102, as the UI 110 may become too crowded with control(s) 112. Moreover, too many control(s) may lead to inaccuracy in field extraction, particularly on a user device 104 with a small form factor such as a smartphone. In such instances, the presence of too many control(s) may not leave enough space on the screen to clearly separate the control(s) 112 from one another, leading to overlap and inaccuracy in position identification and field value extraction. Accordingly, in some implementations the number of presented control(s) 112 may be based at least partly on the type of document 108 as well as the dimensions of the display that is available on the user device 104 (or externally) for presenting the document 108. For example, when executing on a smartphone, the UI 110 may present no more than five controls 112, whereas if it is executing on a desktop computer, the UI 110 may present up to ten controls 112. The number of control(s) 112 may be adjusted to achieve a balance between usability, performance, and/or accuracy of field value extraction, to ensure a positive user experience while also ensuring that the field values are determined rapidly and accurately.

As described above, in some implementations metadata for the document 108 may be incorporated into the document 108, e.g., as a barcode. The metadata may include key-value pairs for one or more fields and the associated value(s). In some instances, the metadata may include the position information 114 indicate the position(s) of one or more fields in the document 108. The metadata may also include other information describing the document 108, such as a type of the document 108, identification information for the user 102, and so forth.

In some implementations, the metadata determined for a document 108 may be used to further train and/or refine the performance of the position engine 126 used to initially predict the position(s) of field(s) in a document 108. For example, position information 114 determined for a particular document 108 may be used to train the position engine 126 to more accurately predict the position(s) of field(s) in that particular type of document 108 in subsequently analyses of documents of that type. In some implementations, the position engine 126 may be trained to predict the position(s) of fields in a document 108 that originates at a particular source. For example, a particular utility company may issue bills that exhibit a substantially constant layout from bill to bill, such as a bill to one customer tends to have fields in the same location as bills to other customers. In such instances, the position engine 126 may consume training data in the form of position information indicating the position(s) of fields in bills from that utility company. Over time, the position engine 126 may more accurately predict the position(s) of fields in bills from the utility company. In some instances, field extraction may become accurate enough, and the position engine 126 may identify field position(s) with sufficient confidence, that user assistance through the control(s) 112 is no longer needed. Accordingly, the user-provided position information may be used as training data to train the position engine sufficiently to enable automatic field value extraction from documents of a particular type and/or from a particular source.

As described above, the control(s) 112 may be initially presented at (e.g., default) position(s) in the UI 110 and/or on the document 108. In some instances, the default position(s) may be lined up on one side of the UI 110 and/or randomly located in the UI 110. In some implementations, the initial position(s) may be determined by the ML-trained position engine 126 as described above, e.g., based on previous identifications of field position(s) in documents of the same type and/or from the same source. The initial position(s) may be determined based on the position(s) of field(s) in a similar bill, a same type of bill, or a bill from the same origin.

Implementations support the use of any suitable type of user device 104 that the user 102 can use to interact with the application 106, and provide input to specify the positions of fields in the document. In some implementations, the application 106 may be an augmented reality and/or virtual reality application that executes on a computing device that provides an augmented reality and/or virtual reality interface. In such implementations, the user can indicate positions in the document by pointing to particular fields in a document, directing their eyes at the particular fields, and/or using other controls to indicate the positions of fields.

Figure 2A:
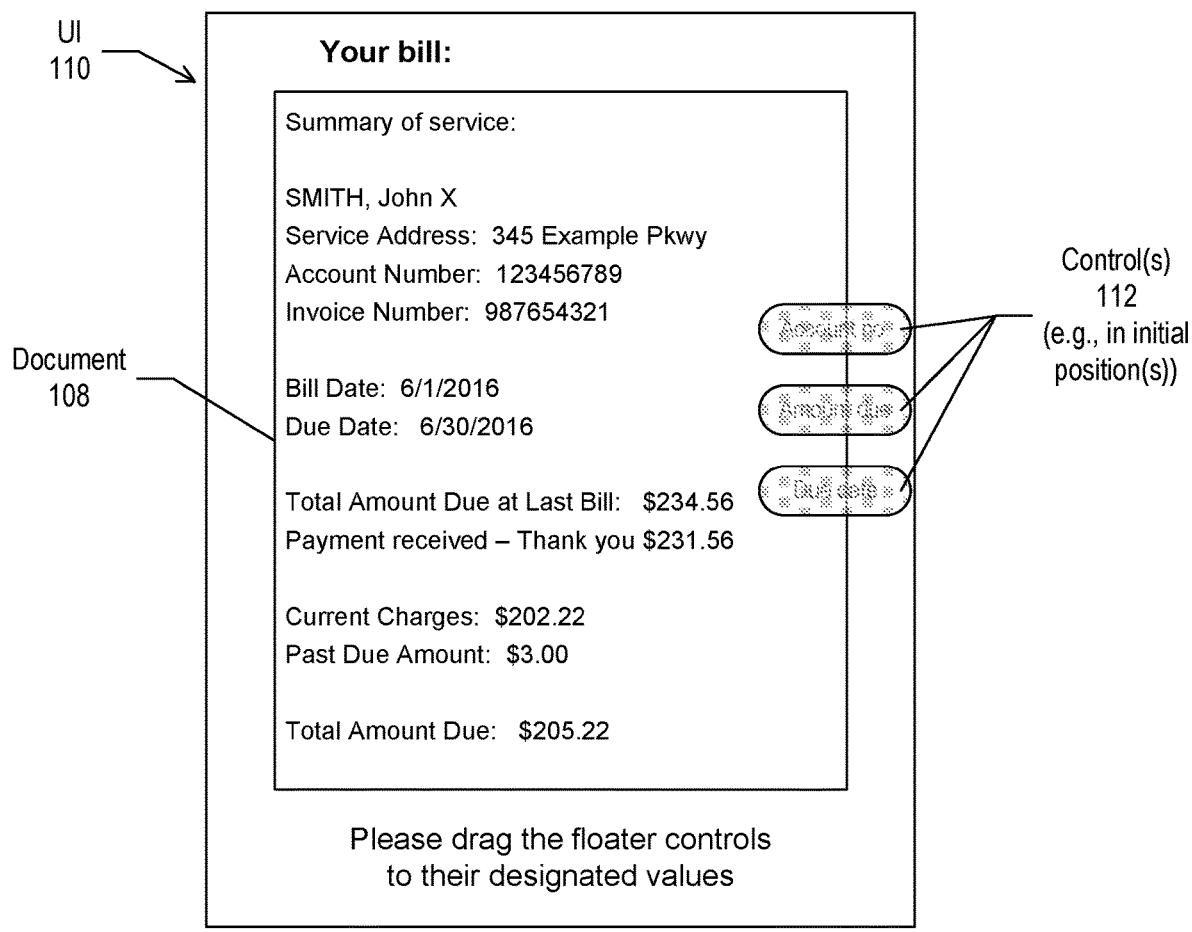
FIGS. 2A, 2B, and 2C depict example user interfaces for extracting data from a document, according to implementations of the present disclosure.
Figure 2B:
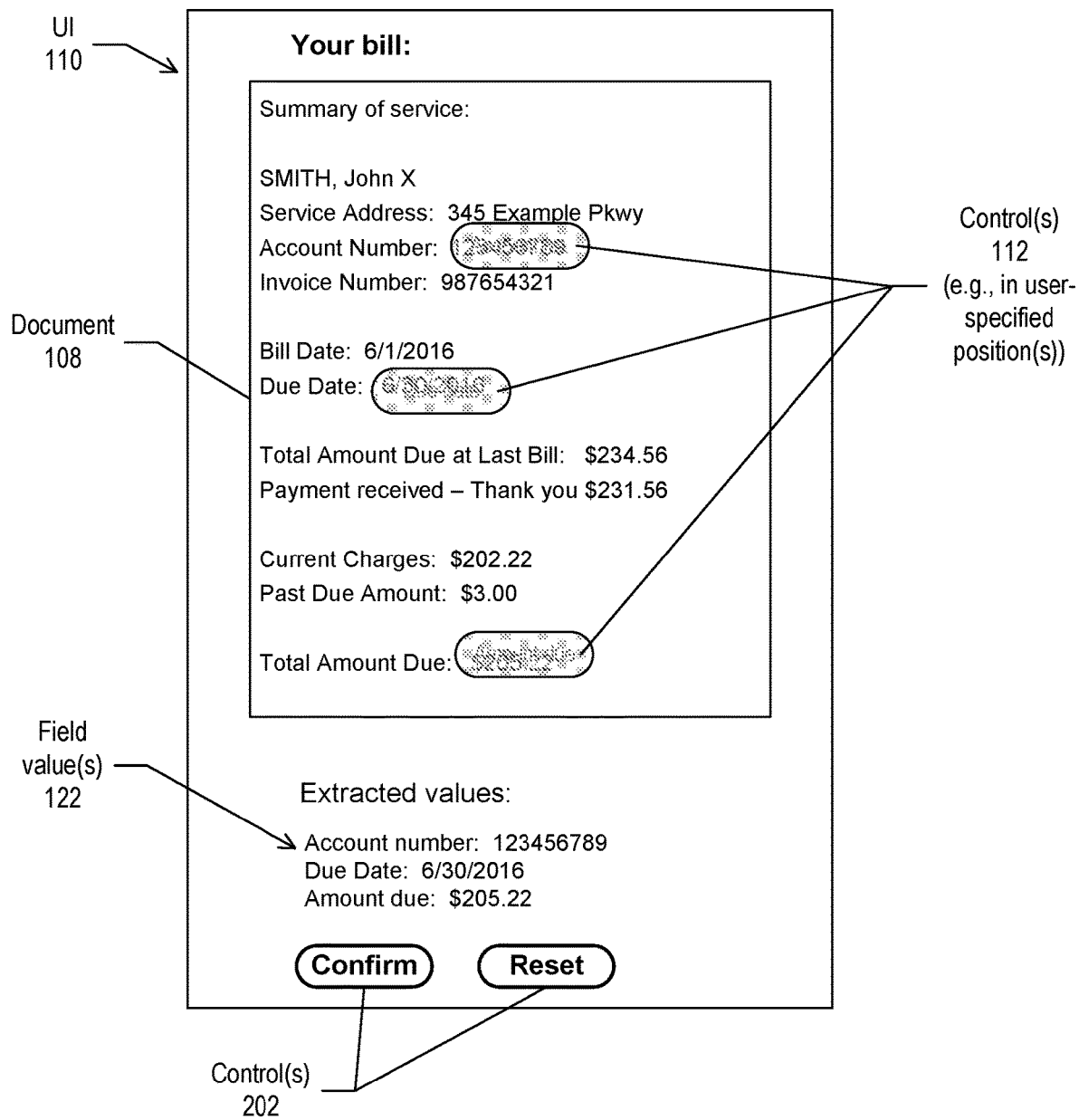
Figure 2C:
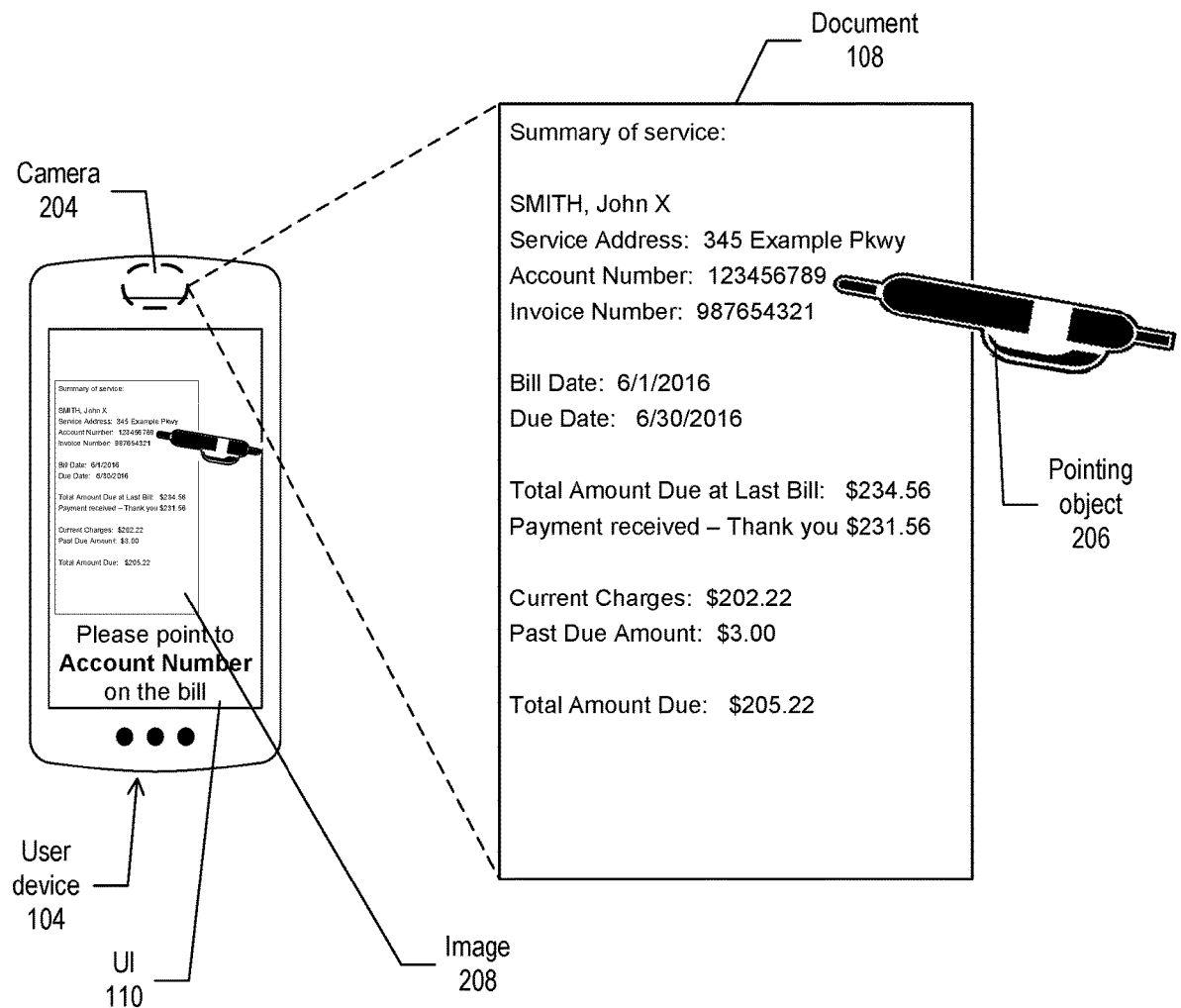

FIGS. 2A, 2B, and 2C depict example UIs 110 for extracting information from a document 108, according to implementations of the present disclosure. Although the examples of FIGS. 2A, 2B, and 2C depict UIs with a particular number, type, and arrangement of UI elements, implementations are not limited to these examples. The UI 110 may present any suitable number, type, and/or arrangement of UI elements, across one or more pages, windows, frames, or other containers, to provide for efficient and accurate field position identification and field value extraction.

In the example of FIG. 2A, a document 108 (e.g., a bill) is presented in the UI 110, and a plurality of controls 112 are initially presented in default locations along one side of the UI 110. In this example, the controls 112 are labeled with tags indicating the field(s) where they are to be placed, such as account number, amount due, due date, and so forth. The UI 110 may prompt the user 102 to move (e.g., drag) each of the controls 112 to the location of the corresponding field on the document 108.

In the example of FIG. 2B, the user 102 has moved the controls 112 to appropriate positions on the document 108. For example, the account number control 112 has been moved to lay over the account number in the document 108, the due date control 112 has been moved to lay over the due date in the document 108, and the amount due control 112 has been moved to lay over the total amount due in the document 108. In some implementations, as in the example shown, the controls 112 may be at least partly transparent such that the portion of the document 108 underneath the control 112 is at least partly visible through the control 112. After the user 102 is satisfied with the positioning of the controls 112, the user 102 may click or otherwise gesture on a control 202 to confirm the positions. In response to this action by the user 102, the application 106 may determine the positions of the controls 112 send the position information 114 (including the positions) to the server device(s) 116 for further processing.

As described above, in some implementations, the extraction of field values may be performed on the user device 104 in addition to or instead of being performed on the server device(s) 116. In such instances, the application 106 may determine the field value(s) 122 based on the position(s) of the control(s) 112. In some instances, the application 106 may present the determined field value(s) 122 in the UI 110, as shown in the example of FIG. 2B. In some implementations, the presented field value(s) 122 may be dynamically updated based on real time analysis of the relevant document portion(s) as the user 102 moves the controls 112 on the document 108. For example, the user 102 may move the amount due control 112 on the document, and the application 106 may dynamically extract a field value from the portion of the document 108 where the control 112 is located at various times. The application 106 may present the dynamically determined field value 122, and periodically update the value as the user 102 moves the control 112. In this way, implementations may provide real time information to enable the user 102 to confirm that their placement of the control(s) 112 is optimal for accurate field value extraction.

In some instances, where the control(s) 112 are associated with particular field(s), the control(s) 112 may be type-sensitive (e.g., strongly typed). For example, the control for "amount due" may be constrained such that only numeric data (e.g., floating point data) is extractable from the document 108 at the location of the control 112. If such a control 112 is placed over text data, data extraction may not occur and/or the extracted text data may not be presented in the UI 110. If he control 112 is moved to be over numeric data, data extraction may then occur and the extracted numeric data may be presented in the field values 122.

In some implementations, the UI 110 may present a reset (or cancel) control 202. If the user 102 clicks on or otherwise gestures on the reset control 202, the various control(s) 112 may return to their initial and/or default locations in the UI 110.

In some implementations, fuzzy (e.g., inexact) analysis may be employed to determine position information 114 and/or field value(s) 122 based on the positioning of the control(s) 112 in the UI 110. For example, the user 102 may not be required to position the control 112 exactly at or over the particular associated field to be extracted from the document 108. In some instances, the field value may be accurately determined if the control 112 is sufficiently close (e.g., close enough) to enable implementations to determine the position and/or field value with sufficient accuracy and/or confidence.

FIG. 2C illustrates implementations in which a physical pointing object 206 is used to indicate the location of one or more fields in the document 108. The pointing object 206 may be any object that is suitable for indicating a position in the document 108 with sufficient accuracy and specificity to enable the extraction of a field value from the portion of the document 108 in proximity to the indicated position. For example, the pointing object 206 may be a pen, pencil, finger, and so forth.

As shown in the example of FIG. 2C, the UI 110 may prompt the user 102 to point to a particular field on the document 108, such as the account number. The user 102 may use the pointing object 206 to indicate the position of the particular field on the (e.g., paper) document 108. The application 106 may then cause a camera 204 to capture an image of the document 108 with the pointing object 206 pointing at a position. The camera 204 may be a component of the user device 104, as in the example. Alternatively, the camera 204 may be a peripheral device that is external to the user device 104 and controllable from processes executing on the user device 104.

The application 106 may determine the one or more fields that are needed to be extracted from the document 108, e.g., based on the type of document. The UI 110 may prompt the user 102 to point to each relevant field to be extracted from the document 108, and an image may be captured for each instance of pointing to a field on the document 108. The captured image(s) may be analyzed to determine the position information 114 that indicates the position(s) of the various field(s) on the document 108. The position information 114 may be employed, as described above, to determine the field value 122 for each of the field(s). The field value(s) 122 may be determined on the user device 104, and/or on the server device(s) 116 based on the communicated position information 114 as described above.

Implementations also support the use of other methods to identifying the position of field(s) in the document. In some implementations, the UI 110 may enable the user 102 to move around in the image of the document 108 and repeatedly center the image on each field that is to be retrieved from the document 108. In some implementations, the UI 110 may provide one or more controls to enable the user 102 to annotate the document 108 to indicate the position(s) of field(s). Such annotations may include the user circling locations of field(s), adding notes or comments, drawing a box around various field(s), and so forth. Implementations may employ any suitable type of UI element to enable the user 102 to identify position(s) of field(s), including but not limited to the (e.g., floater) control(s) 112 shown in FIGS. 2A and 2B.

In some implementations, the application 106, document processing module(s) 118, and/or other processes may attempt an initial analysis and text extraction from the document 108 using OCR, ICR, or other techniques. For those field(s) that are not identifiable using the initial analysis, the user 102 may be prompted to identify the position(s) of the field(s) using any of the methods described herein. If field value(s) 122 cannot be determined even based on the user-provided position information 114, the user 102 may be prompted to enter the needed field value(s) 122 in the UI 110.

Figure 3:
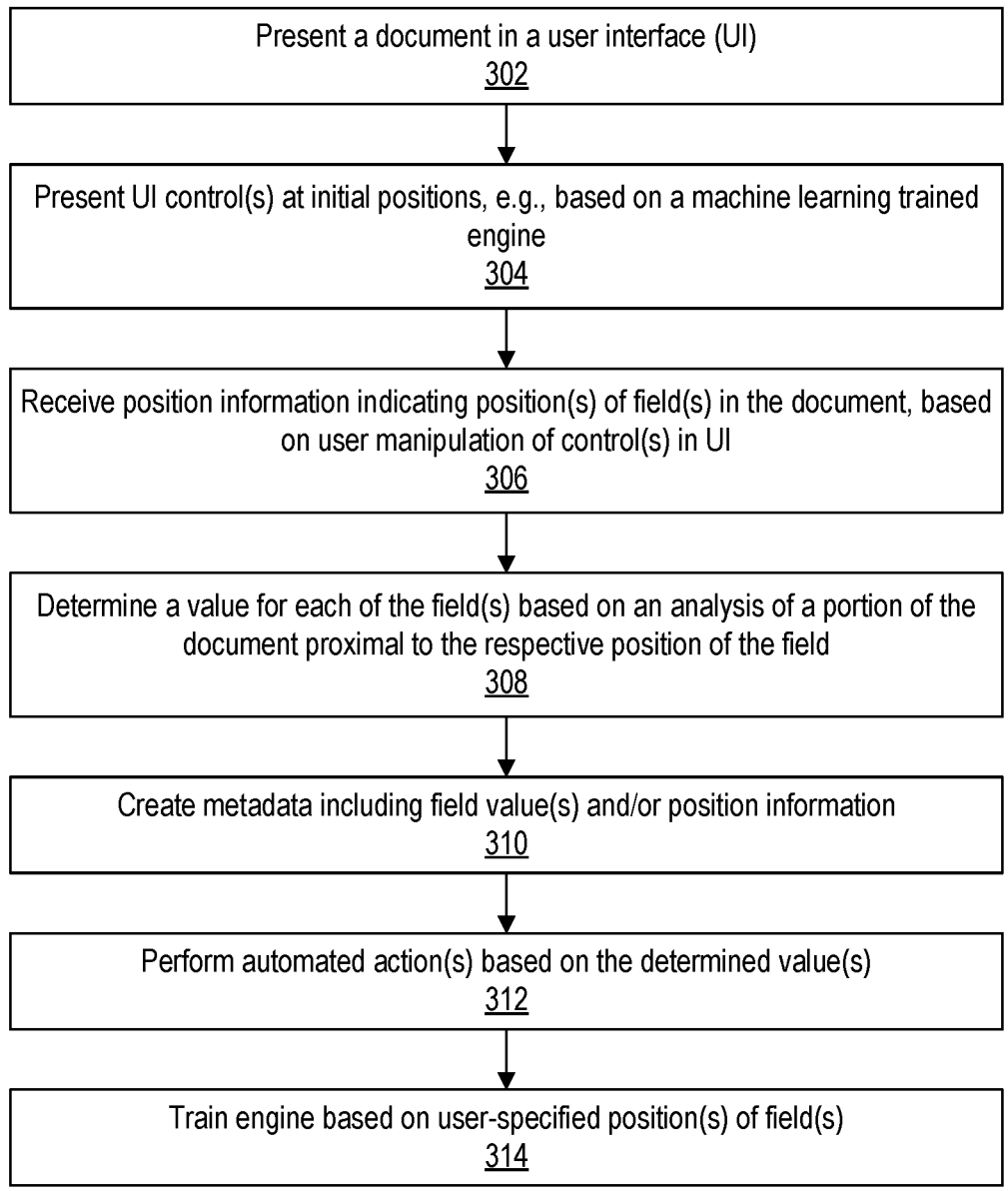
FIG. 3 depicts a flow diagram of an example process for extracting data from a document, according to implementations of the present disclosure.

FIG. 3 depicts a flow diagram of an example process for extracting data from a document, according to implementations of the present disclosure. Operations of the process may be performed by one or more of the application 106, the UI 110, the document processing module(s) 118, the position engine 126, the action module(s) 124, and/or other software module(s) executing on the user device 104, the server device(s) 116, or elsewhere.

A document 108 may be presented (302) in the UI 110 of the application 106. In some implementations, one or more controls 112 may be presented (304) in the UI 110, such as the floater control(s) described above. The control(s) 112 may be presented at initial and/or default position(s) on the document 108 as described above. For example, initial position(s) may be determined by a position engine 126 that is trained using various ML technique(s).

In some implementations, the position engine 126 is trained based on training data that includes a sufficiently large number of documents that have been tagged to indicate the positions of various relevant fields within the document. The position engine 126 may be trained until it is able to accurately predict, with at least a minimum level of confidence, a position of a field in an untagged document. The position engine 126 may then be used to analyze an incoming document and predict, based on its training, a respective portion of the document that includes the position of each field to be evaluated. For example, in instances where the document is a bill to be paid, the position engine 126 may predict a portion of the document that includes the bill due date, the amount due, the billing entity to be paid (e.g., utility company, mortgage lender, etc.), and so forth. The portion may be of any suitable size within the document. In some instances, the position engine 126 may predict a portion that is a particular page of the document where the field is likely to be found, in a multi-page document. In some instances, the position engine 126 may predict a portion that is a paragraph, sentence, or other portion of the document.

Such prediction facilitates more efficient field evaluations, given that somewhat accurate prediction of where a field is likely to be found may lead to an initial positioning of a control near the actual location of the field to be evaluated, thus entailing less movement of the control to indicate a more precise position of the field. This provides for faster field evaluation and a more positive user experience, given that the user may avoid dragging or otherwise moving a control across a long distance within the document to find the field. In some implementations, if the position engine 126 is sufficiently accurate and is able to provide field position estimates with high (above threshold) confidence and sufficient precision, the field value(s) may be determined based on analysis of the document at the predicted position(s) of the field(s), without prompting the user to adjust the control(s) to the position(s) of the fields. Accordingly, after a period of time in which the user-provided position(s) are used to further train and refine the position engine 126, the field evaluation may proceed automatically without user intervention.

The user 102 may be prompted to manipulate (e.g., move) the control(s) 112, from their respective initial location(s), to indicate the position(s) of the various field value(s) 122 to be extracted from the document 108. Position information 114 may be received (306) indicating the position(s) of the field value(s) 122, as indicated by the user action(s). Based on the position information 114, a field value 122 may be determined (308) for each of the field(s). As described above, the field value 122 may be determined based on an analysis of the portion of the document 108 that is at or near the respective identified position of the field. Such analysis may include OCR, ICR, or other suitable techniques.

In some implementations, metadata may be created (310) that describes the field value(s) 122 and/or position information 114 determined for the document 108. As described above, the metadata may include a set of key-value pairs, where each key-value pair is an association between a field and a corresponding field value 122. In some instances, a key-value pair may be an association between a field and the position coordinates of that field in the document 108. The metadata may be incorporated into the document 108 and/or may be stored separately from the document 108. In some implementations, a barcode of one or more dimensions may be generated and added to the document 108, the barcode encoding the metadata for the document 108.

In some implementations, one or more automated actions may be performed (312) based on the determined field value(s) 122. For example, a bill may be paid based on field value(s) 122 extracted from a bill, such as the amount due, due date, account number, and so forth.

In some implementations, the extracted field value(s) 122 from various document(s) 108 may be employed to train (314) the position engine 126. For example, document(s) 108 and their associated metadata (e.g., field position information) may be used as training data to initially train and/or further train the position engine 126 using various 1\t1L technique(s). In this manner, implementations provide for a document data extraction system that is improvable over time, and which may achieve sufficient accuracy so that the user 102 is no longer required to provide position information.

In some implementations, a distributed ledger such as a blockchain may be used to control access to a document and/or certain fields present in the document. The distributed ledger may store access control information that is used to access the document. The distributed ledger may also store the document itself, in at least some implementations. For example, a digital copy of the document (e.g., in PDF or other suitable format), may be stored on the distributed ledger, and the access control information on the distributed ledger may be used to determine which entities are authorized to access the document as a whole, and/or which entities are authorized to access one or more particular data fields in the document. As a particular example, an entity such as a bank payment process may be granted access to fields of the document that are needed to determine a bill payment transaction, such as the recipient of the funds, the amount of funds, the bill due date, and so forth, and the entity may be prevented from accessing other information in the document. In this way, implementations may protect the privacy of sensitive and/or personal user data may granting an entity limited access to only those fields that are to be used to perform a particular action (e.g., paying a bill).

In some implementations, the distributed ledger may be a blockchain. A blockchain is a public or private ledger of all transactions that have been executed in one or more contexts (e.g., negotiable instrument transactions, digital currency transactions, access determinations, instances of providing access, etc.). A blockchain may grow as completed blocks are added with a new set of transactions. In some examples, a single block is provided from multiple transactions. In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (O's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains. The blockchain may be a public blockchain, such that data stored on the blockchain is generally accessible. The blockchain may be a private blockchain, such that the stored data is accessible only to authorized individuals and/or processes on the blockchain.

Figure 4:
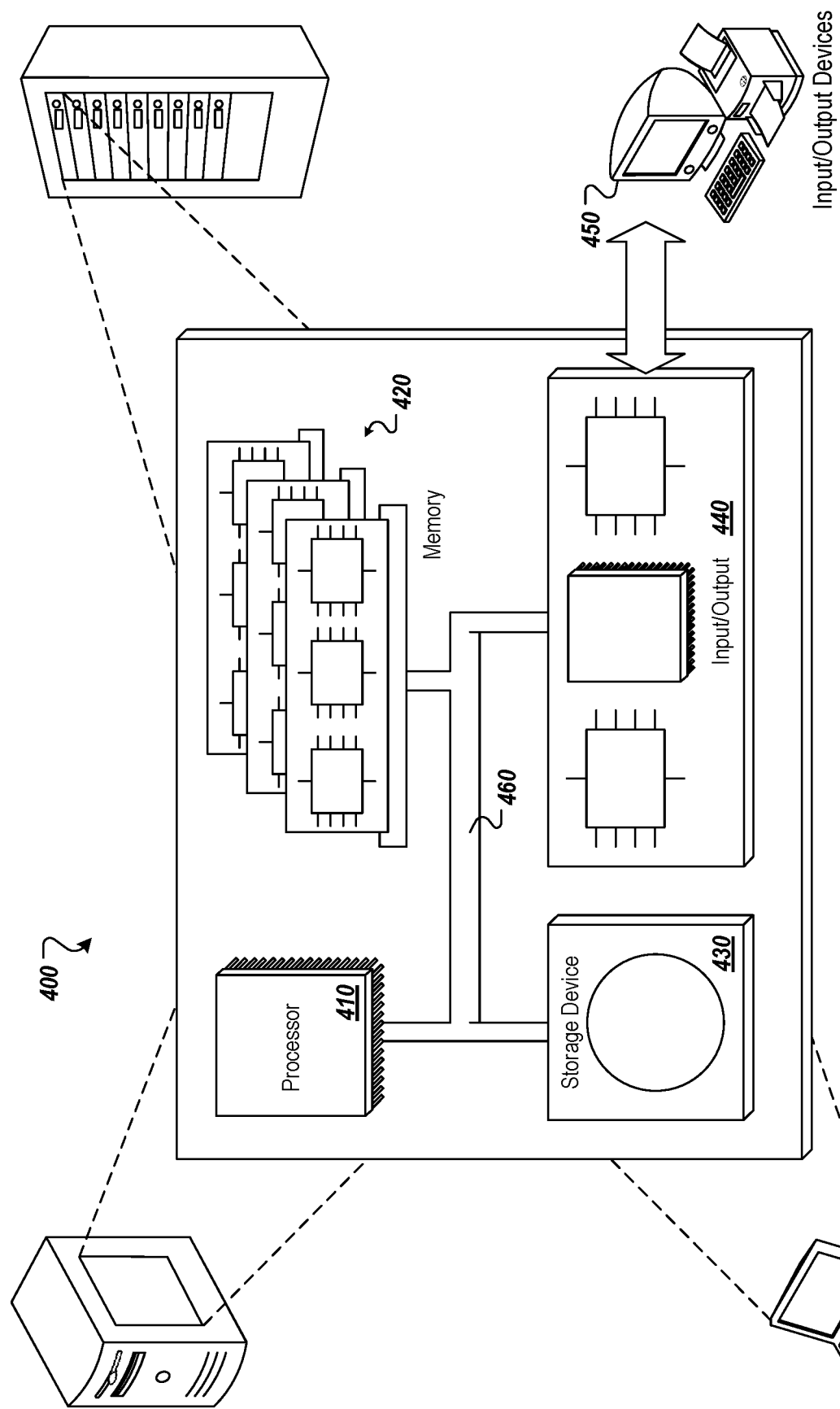
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the user device 104, the server device(s) 116, and/or other device(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may be non-transitory and may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth.

Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors be computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
    presenting, by the at least one processor, a document with a movable control field associated with a field of the document via a user interface, wherein the movable control field is located at a first position in the document;
    receiving, by the at least one processor, an indication of a change in positioning of the movable control field to a second position on the document, wherein the second position is different than the first position;
    determining, by the at least one processor, a value for the field of the document based at least in part on the movable control field and the second position;
    initiating a funds transfer, by the at least one processor, based on the value for the field;
    updating a position engine, by the at least one processor, based on the second position, the movable control field, and the field, wherein the position engine is configured to predict an expected position of an additional movable control field for an additional document presented via the user interface; and
    incorporating, by the at least one processor, metadata into the document, the metadata describing:
        the value for the field of the document; and
        an indication that the expected position of the additional movable control field corresponds to the second position for a viewing of the additional document, wherein the additional movable control field comprises a same label as the movable control field.

2. The method of claim 1, wherein the metadata is incorporated into the document as a barcode of one or more dimensions.

3. The method of claim 1, wherein the metadata comprises coordinate information for the second position with respect to the document.

4. The method of claim 1, wherein the field of the document is indicated by a label that is presented with the movable control field.

5. The method of claim 4, wherein the label comprises one or more numbers, one or more keywords, or a combination thereof, associated with a category type of the document.

6. The method of claim 1, wherein the initiating the funds transfer comprises determining an amount to transfer according to the value of the field.

7. A system, comprising:
- at least one processor; and
- a memory communicatively coupled to the at least one processor, the memory storing instructions which, when executed by the at least one processor, cause the at least one processor to perform operations comprising:
  - presenting a document with a movable control field associated with a field of the document via a user interface, wherein the movable control field is disposed at a first position in the document;
  - receiving an indication of a change in positioning of the movable control field to a second position on the document, wherein the second position is different than the first position;
  - determining a value for the field of the document based at least in part on the movable control field and the second position;
  - initiating a funds transfer based on the value for the field;
  - updating a position engine, by the at least one processor, based on the second position, the movable control field, and the field, wherein the position engine is configured to predict an expected position of an additional movable control field for an additional document presented via the user interface; and
  - incorporating metadata into the document, the metadata comprising:
    - the value for the field of the document; and
    - an indication that an expected position of an additional movable control field for an additional document corresponds to the second position, wherein the additional movable control field comprises a same label as the movable control field.

8. The system of claim 7, the operations further comprising:
- updating a position engine based on the second position, the movable control field, and the field of the document, wherein the position engine is configured to predict the expected position of the additional movable control field for an additional document presented via the user interface.

9. The system of claim 7, wherein the metadata comprises a key-value pair indicating a field name associated with the movable control field and the value for the field of the document.

10. The system of claim 7, wherein the metadata comprises an X-plane coordinate and a Y-plane coordinate, a pixel row and column indication, or a combination thereof, indicating location of the movable control field on the document.

11. The system of claim 7, wherein the field of the document is indicated by a label that is presented with the movable control field.

12. The system of claim 7, wherein a maximum number of movable control fields for the document is based on a type of the document, dimensions of the user interface, or a combination thereof.

13. The system of claim 7, wherein the operations for initiating the funds transfer comprises determining an amount to transfer according to the value the field of the document.

14. One or more non-transitory computer-readable media storing instructions which, when executed by at least one processor, cause the at least one processor to perform operations comprising:
- presenting a document with a movable control field associated with a field of the document via a user interface, wherein the movable control field is disposed at a first position in the document;
- receiving an indication of a change in positioning of the movable control field to a second position on the document, wherein the second position is different than the first position;
- determining a value for the field of the document based at least in part on the movable control field and the second position;
- initiating a funds transfer based on the value for the field of the document;
- updating a position engine based on the second position, the movable control field, and the field of the document, wherein the position engine is configured to predict an expected position of an additional movable control field for an additional document presented via the user interface; and
- incorporating metadata into the document, the metadata comprising:
  - the value for the field of the document; and
  - an indication that the expected position of the additional movable control field corresponds to the second position for viewing of the additional document, and wherein the additional movable control field comprises a same label as the movable control field.

15. The one or more non-transitory computer-readable media of claim 14, wherein the movable control field comprises a free-form field that is initially unassociated with a field of the document.

16. The one or more non-transitory computer-readable media of claim 15, wherein the free-form field is associated with at least one field of the document by a selection of a tag, a label, an identification, or a combination thereof.

17. The one or more non-transitory computer-readable media of claim 16, wherein the selection comprises choosing the tag, the label, the identification, or a combination thereof, from a drop-down list on the user interface.

* * * * *